(12) United States Patent
Fredrickson et al.

(10) Patent No.: US 11,926,265 B2
(45) Date of Patent: *Mar. 12, 2024

(54) AUDIO SYSTEM FOR A UTILITY VEHICLE

(71) Applicant: Polaris Industries Inc., Medina, MN (US)

(72) Inventors: Donovan L. Fredrickson, Independence, MN (US); Jonathan M. Hetland, Little Canada, MN (US); Keith A. Hollman, Osceola, WI (US)

(73) Assignee: Polaris Industries Inc., Medina, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/507,891

(22) Filed: Oct. 22, 2021

(65) Prior Publication Data

US 2022/0041115 A1 Feb. 10, 2022

Related U.S. Application Data

(63) Continuation of application No. 16/522,957, filed on Jul. 26, 2019, now Pat. No. 11,260,803.

(51) Int. Cl.
*B60R 11/02* (2006.01)
*B60R 11/00* (2006.01)
(Continued)

(52) U.S. Cl.
CPC .......... *B60R 11/0217* (2013.01); *B62D 21/02* (2013.01); *B62D 25/14* (2013.01);
(Continued)

(58) Field of Classification Search
CPC ......... B60R 11/0217; B60R 2011/0003; B60R 2011/0005; B60R 2011/0043;
(Continued)

(56) References Cited

U.S. PATENT DOCUMENTS 3,007,726 A 11/1961 Parkin
3,600,768 A 8/1971 Romanzi et al.
(Continued)

FOREIGN PATENT DOCUMENTS

CA 2433019 A1 5/2003
CA 2903511 A1 12/2016
(Continued)

OTHER PUBLICATIONS

MTX (MTX Audio Thunder Sports rzrpod65-owners-manual, 2016) (Year: 2016).*
(Continued)

*Primary Examiner* — Vivian C Chin
*Assistant Examiner* — Douglas J Suthers
(74) *Attorney, Agent, or Firm* — Faegre Drinker Biddle & Reath LLP

(57) ABSTRACT

An all-terrain or utility vehicle includes an audio system having at least one speaker. The at least one speaker is positioned at a forward portion of the operator area and is supported by a body panel. More particularly, the body panel may be configured to receive at least a portion of the speaker as well as at least a portion of an upper frame assembly. In this way, the speaker is positioned to direct sound towards the rider, is generally concealed from a front view of the vehicle, and is positioned within available space on the vehicle above at least a portion of the door.

16 Claims, 13 Drawing Sheets

(51) Int. Cl.
  *B62D 21/02* (2006.01)
  *B62D 25/14* (2006.01)
  *B62D 63/04* (2006.01)
  *H04R 1/02* (2006.01)

(52) U.S. Cl.
  CPC ............ *B62D 63/04* (2013.01); *H04R 1/025* (2013.01); *B60R 2011/0003* (2013.01); *B60R 2011/0005* (2013.01); *B60R 2011/0043* (2013.01); *H04R 2499/13* (2013.01)

(58) Field of Classification Search
  CPC ........ B62D 21/02; B62D 25/14; B62D 63/04; H04R 1/025; H04R 2499/13
  USPC .......................................................... 381/86
  See application file for complete search history.

(56) References Cited

U.S. PATENT DOCUMENTS

| | | | |
|---|---|---|---|
| 3,734,219 A | 5/1973 | Christensen et al. |
| 4,217,970 A | 8/1980 | Chika |
| 4,429,588 A | 2/1984 | Emundts et al. |
| 4,561,323 A | 12/1985 | Stromberg |
| 4,577,716 A | 3/1986 | Norton |
| 4,934,737 A | 6/1990 | Nakatsuka |
| 4,967,944 A | 11/1990 | Waters |
| 5,010,970 A | 4/1991 | Yamamoto |
| 5,020,616 A | 6/1991 | Yagi et al. |
| 5,021,721 A | 6/1991 | Oshita et al. |
| 5,027,915 A | 7/1991 | Suzuki et al. |
| 5,076,383 A | 12/1991 | Inoue et al. |
| 5,078,225 A | 1/1992 | Ohmura et al. |
| 5,083,827 A | 1/1992 | Hollenbaugh, Sr. |
| 5,167,433 A | 12/1992 | Ryan |
| 5,201,562 A | 4/1993 | Dorsey |
| 5,205,371 A | 4/1993 | Karnopp |
| 5,251,713 A | 10/1993 | Enokimoto |
| 5,253,730 A | 10/1993 | Hayashi et al. |
| 5,306,044 A | 4/1994 | Tucker |
| 5,327,989 A | 7/1994 | Furuhashi et al. |
| 5,473,990 A | 12/1995 | Anderson et al. |
| 5,562,066 A | 10/1996 | Gere et al. |
| 5,653,304 A | 8/1997 | Renfroe |
| 5,887,671 A | 3/1999 | Yuki et al. |
| 5,921,343 A | 7/1999 | Yamakaji |
| 6,067,078 A | 5/2000 | Hartman |
| 6,086,158 A | 7/2000 | Zeoli |
| 6,186,547 B1 | 2/2001 | Skabrond et al. |
| 6,293,588 B1 | 9/2001 | Clune |
| 6,309,024 B1 | 10/2001 | Busch |
| 6,328,364 B1 | 12/2001 | Darbishire |
| 6,467,787 B1 | 10/2002 | Marsh |
| 6,502,886 B1 | 1/2003 | Bleau et al. |
| 6,523,634 B1 | 2/2003 | Gagnon et al. |
| 6,626,260 B2 | 9/2003 | Gagnon et al. |
| 6,644,709 B2 | 11/2003 | Nagaki et al. |
| 6,682,118 B2 | 1/2004 | Ryan |
| 6,732,830 B2 | 5/2004 | Gagnon et al. |
| 6,733,060 B1 | 5/2004 | Pavkov et al. |
| 6,767,022 B1 | 7/2004 | Chevalier |
| 6,799,779 B2 | 10/2004 | Shibayama |
| 6,857,498 B2 | 2/2005 | Mtale et al. |
| 6,880,875 B2 | 4/2005 | McClure et al. |
| 6,883,851 B2 | 4/2005 | McClure et al. |
| 6,895,318 B1 | 5/2005 | Barton et al. |
| 6,966,399 B2 | 11/2005 | Tanigaki et al. |
| 7,000,931 B1 | 2/2006 | Chevalier |
| 7,077,233 B2 | 7/2006 | Hasegawa |
| 7,096,988 B2 | 8/2006 | Moriyama |
| 7,118,151 B2 | 10/2006 | Bejin et al. |
| 7,156,439 B2 | 1/2007 | Bejin et al. |
| 7,182,169 B2 | 2/2007 | Suzuki |
| 7,185,732 B2 | 3/2007 | Saito et al. |
| 7,216,733 B2 | 5/2007 | Iwami et al. |
| 7,234,707 B2 | 6/2007 | Green et al. |
| 7,344,156 B2 | 3/2008 | Suzuki et al. |
| 7,357,211 B2 | 4/2008 | Inui |
| 7,370,724 B2 | 5/2008 | Saito et al. |
| 7,374,012 B2 | 5/2008 | Inui et al. |
| 7,380,622 B2 | 6/2008 | Shimizu |
| 7,407,190 B2 | 8/2008 | Berg et al. |
| 7,458,593 B2 | 12/2008 | Saito et al. |
| 7,481,293 B2 | 1/2009 | Ogawa et al. |
| 7,490,694 B1 | 2/2009 | Berg et al. |
| 7,497,299 B2 | 3/2009 | Kobayashi |
| 7,497,471 B2 | 3/2009 | Kobayashi |
| 7,497,472 B2 | 3/2009 | Cymbal et al. |
| 7,503,610 B2 | 3/2009 | Karagitz et al. |
| 7,540,511 B2 | 6/2009 | Saito et al. |
| 7,565,944 B2 | 7/2009 | Sakamoto et al. |
| 7,565,945 B2 | 7/2009 | Okada et al. |
| 7,600,603 B2 | 10/2009 | Okada et al. |
| 7,604,084 B2 | 10/2009 | Okada et al. |
| 7,610,132 B2 | 10/2009 | Yanai et al. |
| 7,625,048 B2 | 12/2009 | Rouhana et al. |
| 7,630,807 B2 | 12/2009 | Yoshimura et al. |
| 7,740,103 B2 | 6/2010 | Sasajima |
| 7,786,886 B2 | 8/2010 | Maruyama et al. |
| 7,819,220 B2 | 10/2010 | Sunsdahl et al. |
| 7,832,770 B2 | 11/2010 | Bradley et al. |
| D633,006 S | 2/2011 | Sanschagrin et al. |
| 7,950,486 B2 | 5/2011 | Van et al. |
| 7,954,679 B2 | 6/2011 | Edwards |
| 8,027,775 B2 | 9/2011 | Takenaka et al. |
| 8,079,602 B2 | 12/2011 | Kinsman et al. |
| 8,104,524 B2 | 1/2012 | Manesh et al. |
| 8,176,957 B2 | 5/2012 | Manesh et al. |
| 8,215,694 B2 | 7/2012 | Smith et al. |
| 8,231,164 B2 | 7/2012 | Schubring et al. |
| 8,271,175 B2 | 9/2012 | Takenaka et al. |
| 8,302,711 B2 | 11/2012 | Kinsman et al. |
| 8,328,235 B2 | 12/2012 | Schneider et al. |
| 8,382,125 B2 | 2/2013 | Sunsdahl et al. |
| 8,464,824 B1 | 6/2013 | Reisenberger |
| 8,465,050 B1 | 6/2013 | Spindler et al. |
| 8,538,628 B2 | 9/2013 | Backman |
| 8,548,710 B1 | 10/2013 | Reisenberger |
| 8,596,405 B2 | 12/2013 | Sunsdahl et al. |
| 8,613,335 B2 | 12/2013 | Deckard et al. |
| 8,613,337 B2 | 12/2013 | Kinsman et al. |
| 8,640,814 B2 | 2/2014 | Deckard et al. |
| 8,781,705 B1 | 7/2014 | Reisenberger |
| D711,778 S | 8/2014 | Chun et al. |
| D712,309 S | 9/2014 | Wu et al. |
| 8,827,025 B2 | 9/2014 | Hapka |
| 8,827,028 B2 | 9/2014 | Sunsdahl et al. |
| 8,997,908 B2 | 4/2015 | Kinsman et al. |
| 8,998,253 B2 | 4/2015 | Novotny et al. |
| 9,010,768 B2 | 4/2015 | Kinsman et al. |
| D730,239 S | 5/2015 | Gonzalez |
| D756,845 S | 5/2016 | Flores |
| D764,974 S | 8/2016 | Mikhailov et al. |
| 9,434,244 B2 | 9/2016 | Sunsdahl et al. |
| 9,440,671 B2 | 9/2016 | Schlangen et al. |
| 9,469,329 B1 | 10/2016 | Leanza |
| D772,755 S | 11/2016 | Tandrup et al. |
| 9,540,052 B2 | 1/2017 | Burt, II et al. |
| 9,573,561 B2 | 2/2017 | Muto et al. |
| D780,627 S | 3/2017 | Jhant et al. |
| 9,592,713 B2 | 3/2017 | Kinsman et al. |
| D784,200 S | 4/2017 | Dunshee et al. |
| 9,623,912 B2 | 4/2017 | Schlangen |
| D785,502 S | 5/2017 | Dunshee et al. |
| 9,649,928 B2 | 5/2017 | Danielson et al. |
| 9,713,976 B2 | 7/2017 | Miller et al. |
| 9,725,023 B2 | 8/2017 | Miller et al. |
| 9,776,481 B2 | 10/2017 | Deckard et al. |
| 9,789,909 B2 | 10/2017 | Erspamer et al. |
| 9,809,102 B2 | 11/2017 | Sunsdahl et al. |
| 9,895,946 B2 | 2/2018 | Schlangen et al. |
| 10,011,189 B2 | 7/2018 | Sunsdahl et al. |
| 10,017,090 B2 | 7/2018 | Franker et al. |
| 10,112,555 B2 | 10/2018 | Aguilera et al. |

(56) References Cited

U.S. PATENT DOCUMENTS

| | | |
|---|---|---|
| 10,124,709 B2 | 11/2018 | Bohnsack et al. |
| 10,154,377 B2 | 12/2018 | Post et al. |
| 10,183,605 B2 | 1/2019 | Weber et al. |
| 10,246,153 B2 | 4/2019 | Deckard et al. |
| 10,369,861 B2 | 8/2019 | Deckard et al. |
| 10,399,401 B2 | 9/2019 | Schlangen et al. |
| 10,486,748 B2 | 11/2019 | Deckard et al. |
| D890,026 S | 7/2020 | Nightingale et al. |
| 10,864,828 B2 | 12/2020 | Sunsdahl et al. |
| D906,888 S | 1/2021 | Satulovsky |
| 10,926,618 B2 | 2/2021 | Deckard et al. |
| 10,926,664 B2 | 2/2021 | Sunsdahl et al. |
| 10,960,941 B2 | 3/2021 | Endrizzi et al. |
| 2001/0021887 A1 | 9/2001 | Obradovich et al. |
| 2001/0035642 A1 | 11/2001 | Gotz et al. |
| 2001/0041126 A1 | 11/2001 | Morin et al. |
| 2002/0082752 A1 | 6/2002 | Obradovich |
| 2002/0135175 A1 | 9/2002 | Schroth |
| 2003/0015531 A1 | 1/2003 | Choi |
| 2003/0057724 A1 | 3/2003 | Nagaki et al. |
| 2003/0132075 A1 | 7/2003 | Drivers |
| 2003/0205867 A1 | 11/2003 | Coelingh et al. |
| 2004/0010383 A1 | 1/2004 | Lu et al. |
| 2004/0041358 A1 | 3/2004 | Hrovat et al. |
| 2004/0066091 A1 | 4/2004 | King |
| 2004/0079561 A1 | 4/2004 | Ozawa et al. |
| 2004/0107591 A1 | 6/2004 | Cuddy |
| 2004/0108159 A1 | 6/2004 | Rondeau et al. |
| 2004/0169347 A1 | 9/2004 | Seki |
| 2004/0195019 A1 | 10/2004 | Kato et al. |
| 2004/0221669 A1 | 11/2004 | Shimizu et al. |
| 2004/0226384 A1 | 11/2004 | Shimizu et al. |
| 2004/0231900 A1 | 11/2004 | Tanaka et al. |
| 2005/0012421 A1 | 1/2005 | Fukuda et al. |
| 2005/0045414 A1 | 3/2005 | Takagi et al. |
| 2005/0073187 A1 | 4/2005 | Frank et al. |
| 2005/0131604 A1 | 6/2005 | Lu |
| 2005/0231145 A1 | 10/2005 | Mukai et al. |
| 2005/0235767 A1 | 10/2005 | Shimizu et al. |
| 2005/0235768 A1 | 10/2005 | Shimizu et al. |
| 2005/0242677 A1 | 11/2005 | Akutsu et al. |
| 2005/0248173 A1 | 11/2005 | Bejin et al. |
| 2005/0257989 A1 | 11/2005 | Iwami et al. |
| 2005/0257990 A1 | 11/2005 | Shimizu |
| 2005/0267660 A1 | 12/2005 | Fujiwara et al. |
| 2006/0017301 A1 | 1/2006 | Edwards |
| 2006/0022619 A1 | 2/2006 | Koike et al. |
| 2006/0042862 A1 | 3/2006 | Saito et al. |
| 2006/0055139 A1 | 3/2006 | Furumi et al. |
| 2006/0065472 A1 | 3/2006 | Ogawa et al. |
| 2006/0075840 A1 | 4/2006 | Saito et al. |
| 2006/0076180 A1 | 4/2006 | Saito et al. |
| 2006/0108174 A1 | 5/2006 | Saito et al. |
| 2006/0131088 A1 | 6/2006 | Pawusch et al. |
| 2006/0131865 A1 | 6/2006 | Wasek et al. |
| 2006/0162990 A1 | 7/2006 | Saito et al. |
| 2006/0169525 A1 | 8/2006 | Saito et al. |
| 2006/0175124 A1 | 8/2006 | Saito et al. |
| 2006/0180385 A1 | 8/2006 | Yanai et al. |
| 2006/0181104 A1 | 8/2006 | Khan et al. |
| 2006/0185741 A1 | 8/2006 | McKee |
| 2006/0185927 A1 | 8/2006 | Sakamoto et al. |
| 2006/0191734 A1 | 8/2006 | Kobayashi |
| 2006/0191735 A1 | 8/2006 | Kobayashi |
| 2006/0191737 A1 | 8/2006 | Kobayashi |
| 2006/0191739 A1 | 8/2006 | Koga |
| 2006/0196721 A1 | 9/2006 | Saito et al. |
| 2006/0196722 A1 | 9/2006 | Makabe et al. |
| 2006/0201270 A1 | 9/2006 | Kobayashi |
| 2006/0207823 A1 | 9/2006 | Okada et al. |
| 2006/0207824 A1 | 9/2006 | Saito et al. |
| 2006/0207825 A1 | 9/2006 | Okada et al. |
| 2006/0208564 A1 | 9/2006 | Yuda et al. |
| 2006/0212200 A1 | 9/2006 | Yanai et al. |
| 2006/0219463 A1 | 10/2006 | Seki et al. |
| 2006/0219469 A1 | 10/2006 | Okada et al. |
| 2006/0219470 A1 | 10/2006 | Magawa et al. |
| 2006/0255610 A1 | 11/2006 | Bejin et al. |
| 2006/0288800 A1 | 12/2006 | Mukai et al. |
| 2007/0013181 A1 | 1/2007 | Heck |
| 2007/0023566 A1 | 2/2007 | Howard |
| 2007/0068726 A1 | 3/2007 | Shimizu |
| 2007/0074588 A1 | 4/2007 | Harata et al. |
| 2007/0074589 A1 | 4/2007 | Harata et al. |
| 2007/0074927 A1 | 4/2007 | Okada et al. |
| 2007/0074928 A1 | 4/2007 | Okada et al. |
| 2007/0095601 A1 | 5/2007 | Okada et al. |
| 2007/0096449 A1 | 5/2007 | Okada et al. |
| 2007/0175696 A1 | 8/2007 | Saito et al. |
| 2007/0242398 A1 | 10/2007 | Ogawa |
| 2007/0261904 A1 | 11/2007 | Fecteau et al. |
| 2008/0023240 A1 | 1/2008 | Sunsdahl et al. |
| 2008/0023249 A1 | 1/2008 | Sunsdahl et al. |
| 2008/0053743 A1 | 3/2008 | Tomita |
| 2008/0059034 A1 | 3/2008 | Lu |
| 2008/0106115 A1* | 5/2008 | Hughes ............... B62D 29/043 296/102 |
| 2008/0143505 A1 | 6/2008 | Maruyama et al. |
| 2008/0172155 A1 | 7/2008 | Takamatsu et al. |
| 2008/0183353 A1 | 7/2008 | Post et al. |
| 2008/0199253 A1 | 8/2008 | Okada et al. |
| 2008/0296884 A1 | 12/2008 | Rouhana et al. |
| 2009/0065285 A1 | 3/2009 | Maeda et al. |
| 2009/0078491 A1 | 3/2009 | Tsutsumikoshi et al. |
| 2009/0093928 A1 | 4/2009 | Getman et al. |
| 2009/0108617 A1 | 4/2009 | Songwe, Jr. |
| 2009/0152035 A1 | 6/2009 | Okada et al. |
| 2009/0152036 A1 | 6/2009 | Okada et al. |
| 2009/0178871 A1 | 7/2009 | Sunsdahl et al. |
| 2009/0184531 A1* | 7/2009 | Yamamura ............ B62D 33/02 296/65.01 |
| 2009/0189373 A1 | 7/2009 | Schramm et al. |
| 2009/0301830 A1 | 12/2009 | Kinsman et al. |
| 2009/0302590 A1 | 12/2009 | Van et al. |
| 2010/0017059 A1 | 1/2010 | Lu et al. |
| 2010/0090797 A1 | 4/2010 | Koenig et al. |
| 2010/0194086 A1 | 8/2010 | Yamamura et al. |
| 2010/0211261 A1 | 8/2010 | Sasaki et al. |
| 2010/0314191 A1 | 12/2010 | Deckard et al. |
| 2011/0035089 A1 | 2/2011 | Hirao et al. |
| 2011/0297462 A1 | 12/2011 | Grajkowski et al. |
| 2011/0309118 A1 | 12/2011 | Wada |
| 2012/0029770 A1 | 2/2012 | Hirao et al. |
| 2012/0078470 A1 | 3/2012 | Hirao et al. |
| 2012/0085588 A1 | 4/2012 | Kinsman et al. |
| 2012/0193163 A1 | 8/2012 | Wimpfheimer et al. |
| 2012/0223500 A1 | 9/2012 | Kinsman et al. |
| 2012/0247888 A1 | 10/2012 | Chikuma et al. |
| 2013/0033070 A1 | 2/2013 | Kinsman et al. |
| 2013/0041545 A1 | 2/2013 | Baer et al. |
| 2013/0079988 A1 | 3/2013 | Hirao et al. |
| 2013/0199097 A1 | 8/2013 | Spindler et al. |
| 2013/0319785 A1 | 12/2013 | Spindler et al. |
| 2013/0338869 A1 | 12/2013 | Tsumano |
| 2014/0103627 A1 | 4/2014 | Deckard et al. |
| 2014/0294195 A1 | 10/2014 | Perez et al. |
| 2014/0358373 A1 | 12/2014 | Kikuchi et al. |
| 2015/0002404 A1 | 1/2015 | Hooton |
| 2015/0029018 A1 | 1/2015 | Bowden et al. |
| 2015/0039199 A1 | 2/2015 | Kikuchi |
| 2015/0057885 A1 | 2/2015 | Brady et al. |
| 2015/0061275 A1 | 3/2015 | Deckard et al. |
| 2015/0078580 A1 | 3/2015 | Schwerdtfeger et al. |
| 2015/0210137 A1 | 7/2015 | Kinsman et al. |
| 2016/0059660 A1 | 3/2016 | Brady et al. |
| 2016/0332553 A1 | 11/2016 | Miller et al. |
| 2017/0013336 A1 | 1/2017 | Stys et al. |
| 2017/0120946 A1 | 5/2017 | Gong et al. |
| 2017/0131095 A1 | 5/2017 | Kim |
| 2017/0199094 A1 | 7/2017 | Duff et al. |
| 2017/0334500 A1 | 11/2017 | Jarek et al. |
| 2018/0007466 A1 | 1/2018 | Hess et al. |
| 2018/0022391 A1 | 1/2018 | Erspamer et al. |
| 2018/0065465 A1 | 3/2018 | Ward et al. |

(56) References Cited

U.S. PATENT DOCUMENTS

| | | |
|---|---|---|
| 2018/0328321 A1 | 11/2018 | Toda et al. |
| 2019/0110161 A1 | 4/2019 | Rentz et al. |
| 2019/0143871 A1 | 5/2019 | Weber et al. |
| 2019/0193501 A1 | 6/2019 | Brady et al. |
| 2019/0210668 A1 | 7/2019 | Endrizzi et al. |
| 2019/0215606 A1 | 7/2019 | You et al. |
| 2019/0217909 A1 | 7/2019 | Deckard et al. |
| 2019/0256010 A1 | 8/2019 | Baba et al. |
| 2019/0265064 A1 | 8/2019 | Koenig et al. |
| 2019/0306599 A1 | 10/2019 | Nagai et al. |
| 2020/0001673 A1 | 1/2020 | Schlangen et al. |
| 2020/0070709 A1 | 3/2020 | Weber et al. |
| 2020/0122776 A1 | 4/2020 | Schlangen et al. |
| 2020/0262285 A1 | 8/2020 | Sunsdahl et al. |
| 2020/0363054 A1* | 11/2020 | Wilson .............. F21V 33/0056 |
| 2021/0024007 A1 | 1/2021 | Fredrickson et al. |
| 2021/0206438 A1 | 7/2021 | Levin et al. |

FOREIGN PATENT DOCUMENTS

| | | |
|---|---|---|
| CN | 1646359 A | 7/2005 |
| CN | 201007087 Y | 1/2008 |
| CN | 202986930 U | 6/2013 |
| CN | 104442637 A | 3/2015 |
| CN | 104661903 A | 5/2015 |
| CN | 107251577 A | 10/2017 |
| CN | 107635800 A | 1/2018 |
| CN | 108859990 A | 11/2018 |
| DE | 2752798 A1 | 6/1978 |
| DE | 3007726 A1 | 9/1981 |
| DE | 102010020544 A1 | 1/2011 |
| EP | 0697306 A1 | 2/1996 |
| FR | 2907410 A1 | 4/2008 |
| GB | 2316923 A | 3/1998 |
| JP | 53-101625 A | 9/1978 |
| JP | 2005-193788 A | 7/2005 |
| JP | 2006-232058 A | 9/2006 |
| JP | 2006-232061 A | 9/2006 |
| JP | 2006-256579 A | 9/2006 |
| JP | 2006-256580 A | 9/2006 |
| JP | 2006-281839 A | 10/2006 |
| JP | 2007-106319 A | 4/2007 |
| JP | 2010-095106 A | 4/2010 |
| WO | 03041446 A2 | 5/2003 |
| WO | 03/70543 A1 | 8/2003 |
| WO | 2009/096998 A1 | 8/2009 |
| WO | 2014/039432 A2 | 3/2014 |
| WO | 2014/039433 A2 | 3/2014 |
| WO | 2014/047488 A1 | 3/2014 |
| WO | 2014/059258 A1 | 4/2014 |
| WO | 2019/140026 A1 | 7/2019 |

OTHER PUBLICATIONS

"2020 Polaris RZR—Is this the Real Deal?" Jul. 16, 2019. Youtube. https://www.youtube.com/watch?v=8J7uX6Y4UOc.
"Evolution of the RZR: Which One is the Best?" Aug. 23, 2018. Youtube. https://www.youtube.com/watch?v=QE6VyxWxoow.
Polaris RZR XP4 1000 Launch Video—Polaris RZR Sport Side by Side ATV. Apr. 25, 2014. Youtube, https://www.youtube.com/watch?v=roncbPaRIMU.
2009 Honda Big Red, ATV Illustrated at http://www.atvillustrated.com/?q=node/6615/20/2008, 6 pgs.
2016 MUDPRO 700 Limited, Artic Cat, http://www.articcat.com/dirt/atvs/model/2016-en-mudpro-700-limited/, copyright 2015, 23 pages.
All-Terrain Vehicles. Design—(Copyrights) Questel) orbit.com. [Online PDF compilation of references selected by examiner] 72 pgs. Print Dates Range Aug. 7, 2020-Mar. 18, 2019 [Retrieved Jun. 25, 2021].
Arctic Cat, company website, Prowler XT 650 H1, undated, 9 pgs.
BRP Can-Am Commander photo, undated; 1 page.
Buyer's Guide Supplement, 2006 Kart Guide, Powersports Business Magazine; 6 pages.
Club Car, Company Website, product pages for XRT 1500 SE, undated; 2 pages.
DuneGuide.com, "Product Review 2009 Honda Big Red MUV," retrieved from http:www.duneguide.com/ProductReview.sub.--Honda.sub.--BigRed.htm, May 20, 2008, 3 pgs.
High-Performance "Truck Steering" Automotive Engineering, Society of Automotive Engineers. Warrendale, Us, vol. 98. No. 4, Apr. 1, 1990, pp. 56-60.
Honda Hippo 1800 New Competition for Yamaha's Rhino, Dirt Wheels Magazine, Apr. 2006, pp. 91-92.
International Preliminary Report on Patentability issued by The International Bureau of WIPO, dated Apr. 14, 2015, for International Patent Application No. PCT/US2013/064516; 18 pages.
International Preliminary Report on Patentability received for PCT Patent Application No. PCT/US2019/012958, dated Jul. 23, 2020, 20 pages.
International Preliminary Report on Patentability received for PCT Patent Application No. PCT/US2020/042787, dated Jun. 24, 2021, 17 pages.
International Search Report and Written Opinion issued by the European Patent Office, dated Jan. 14, 2014, for International Patent Application No. PCT/US2013/064516; 24 pages.
International Search Report and Written Opinion issued by the International Searching Authority, dated Oct. 21, 2020, for International Patent Application No. PCT/US2020/42787; 18 pages.
International Search Report and Written Opinion received for PCT Patent Application No. PCT/US2019/012958, dated Jul. 3, 2019, 27 pages.
Kawasaki Mule The Off-Road Capable 610 4 .times. 4 XC Brochure 2011, .Copyrgt. 2010, 6 pages.
Kawasaki Mule Utility Vehicle Brochure 2009, .Copyrgt. 2008; 10 pages.
Kawasaki Teryx 750 F1 4 x 4 Sport Brochure 2011, (Copyrights) 2010; 6 pages.
MTX (IMTX Audio Thunder Sports RZRPod65-owners-manual, 2016); 8 pages.
Office Action issued by the Chinese Patent Office, dated Jun. 9, 2021, for Chinese Patent Application No. 201980007897.1; 6 pages (3 pages of English Translation and 3 pages of Original Document).
Outlander X mr 850, available at https://can-am.brp.com/off-road/atv/outlander/outlander-x-mr-850.html; . Copyrgt. 2003-2017; 3 pages.
Patent Examination Report issued by the Australian Government IP Australia, dated Apr. 7, 2016, for Australian Patent Application No. 2013329090; 3 pages.
Polaris Ranger Brochure 2009, copyright 2008; 32 pages.
Polaris Ranger Brochure ATVs and Side .times. Sides Brochure 2010, .Copyrgt. 2009, 26 pages.
Polaris Ranger Off-Road Utility Vehicles Brochure 2004, .Copyrgt. 2003; 20 pages.
Polaris Ranger RZR Brochure 2011, .Copyrgt. 2010; 16 pages.
Polaris Ranger Welcome to Ranger Country Brochure 2006, .Copyrgt. 2005, 24 pages.
Polaris Ranger Work/Play Only Brochure 2008, Copyrgt. 2007, 28 pages.
Ray Sedorchuk, New for 2004, Yamaha Rhino 660 4 x 4, ATV Connection Magazine, (Copyrights) 2006; 3 pages.
Redline Specs, copyright 2008, available at www.RedlinePerforms.com., 2 pages.
Renegade X MR 1000R, Can-Am, http://can-am.brp.com/off-road/atv/renegade/renegade-x-mr-1000R.html, copyright 2003-2015, 12 pages.
Select Increments 2007-2018 Compatible With Jeep Wrangler JK and Unlimited With Infinity or Alpine Premium Factory Systems Pillar Pods with Kicker speakers PP0718-IA-K (Select), Dec. 14, 2018; 6 pages.
Work/Play Only Ranger brochure, .Copyrgt. 2007, Polaris Industries Inc., 28 pgs.
Yamaha, Company Website, 2006 Rhino 450 Auto 4 .times. 4, .Copyrgt. 2005, 3 pages.

(56) References Cited

OTHER PUBLICATIONS

Yamaha, Company Website, Rhino 660 Auto 4 x 4 Exploring Edition Specifications, (Copyrights) 2006; 3 pages.

* cited by examiner

AUDIO SYSTEM FOR A UTILITY VEHICLE

CROSS-REFERENCE TO RELATED APPLICATIONS

This application is a continuation of U.S. patent application Ser. No. 16/522,957, filed Jul. 26, 2019, titled AUDIO SYSTEM FOR A UTILITY VEHICLE, the complete disclosure of which is expressly incorporated by reference herein.

The present application is related to U.S. patent application Ser. No. 16/244,462, filed Jan. 10, 2019, and entitled "VEHICLE" and U.S. Provisional Patent Application Ser. No. 62/840,654, filed Apr. 30, 2019, and entitled "VEHICLE", the complete disclosures of which are expressly incorporated by reference herein.

FIELD OF THE DISCLOSURE

The present invention relates generally to an audio system for a vehicle and, in particular, to the location and mounting of speakers and audio components on all-terrain or utility vehicle.

BACKGROUND OF THE DISCLOSURE

Some vehicles such as utility vehicles, all-terrain vehicles, tractors, and others include infotainment options for the rider, which allow the rider to listen to music, use Bluetooth connectivity for cellular devices, engage in intervehicle communications, review and select operating conditions for the vehicle, etc. To allow for these options, such vehicles include an audio systems with at least one speaker.

However, there can be challenges to finding available space in the vehicle cabin for speakers. As such, it is known that speakers may be positioned near various body panels or other surfaces that can negatively impact or divert the sound away from the rider. For example, the speaker(s) may be positioned in the door or kick panel of a vehicle such that the speaker(s) does not focus or direct sound toward the rider's ears/head. Further, aesthetically, it may be desirable to allow the speaker and/or other components of the audio system to blend in with various body panels or frame members of the vehicle. As such, there is a need for an audio system for an all-terrain or utility vehicle which provides appropriate sound quality to the rider and utilizes available space on the vehicle.

SUMMARY OF THE DISCLOSURE

In one embodiment of the present disclosure, a utility vehicle comprises a frame assembly having an upper frame assembly and a lower frame assembly coupled to each other at a coupling location; a body assembly supported by the frame assembly and including a dashboard assembly; and an open-air operator area positioned generally below an upper extent of the upper frame assembly and rearward of the coupling location. The utility vehicle also comprises an audio system configured to project sound within the operator area. The audio system includes at least one speaker positioned above the dashboard assembly.

In another embodiment of the present disclosure, a utility vehicle comprises a frame assembly having an upper frame assembly and a lower frame assembly coupled to each other at a coupling location; a body assembly including at least a hood and a door and supported by the frame assembly; and an operator area positioned generally below an upper extent of the upper frame assembly and rearward of the coupling location. The utility vehicle also comprises an audio system configured to project sound within the operator area. The audio system includes at least one speaker positioned above a portion of the door.

In a further embodiment of the present disclosure, a utility vehicle comprises a frame assembly including a lower frame assembly and an upper frame assembly. The upper frame assembly is coupled to the lower frame assembly at a first connection location. The utility vehicle also comprises a body assembly supported by the frame assembly and comprising a plurality of body panels. Additionally, the utility vehicle comprises an operator area defined by the upper and lower frame assemblies which includes seating configured to support at least an operator of the utility vehicle. The utility vehicle also comprises an audio system configured to project sound within the operator area. At least one of the plurality of body panels is configured to support a portion of the audio system and a portion of the frame assembly. The at least one of the plurality of body panels is further configured to conceal the first connection location.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, where.

Corresponding reference characters indicate corresponding parts throughout the several views. Unless stated otherwise the drawings are proportional.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to any vehicle with one or more ground-engaging members and a continuously variable transmission, including, but not limited to, all-terrain vehicles, motorcycles, snowmobiles, scooters, three-wheeled vehicles, and golf carts.

Referring to FIGS. 1-7, an illustrative embodiment of a utility vehicle 2 is shown. Vehicle 2 is configured for off-road operation. Vehicle 2 includes a plurality of ground-engaging members 4, illustratively front wheels 6 and rear wheels 8. In one embodiment, one or more of ground-engaging members 4 may be replaced with tracks, such as the Prospector II Tracks available from Polaris Industries, Inc., located at 2100 Highway 55 in Medina, MN 55340 or non-pneumatic tires, such as those shown in U.S. Pat. Nos. 8,176,957 and 8,104,524, the complete disclosures of which are expressly incorporated herein by reference.

Figure 1:
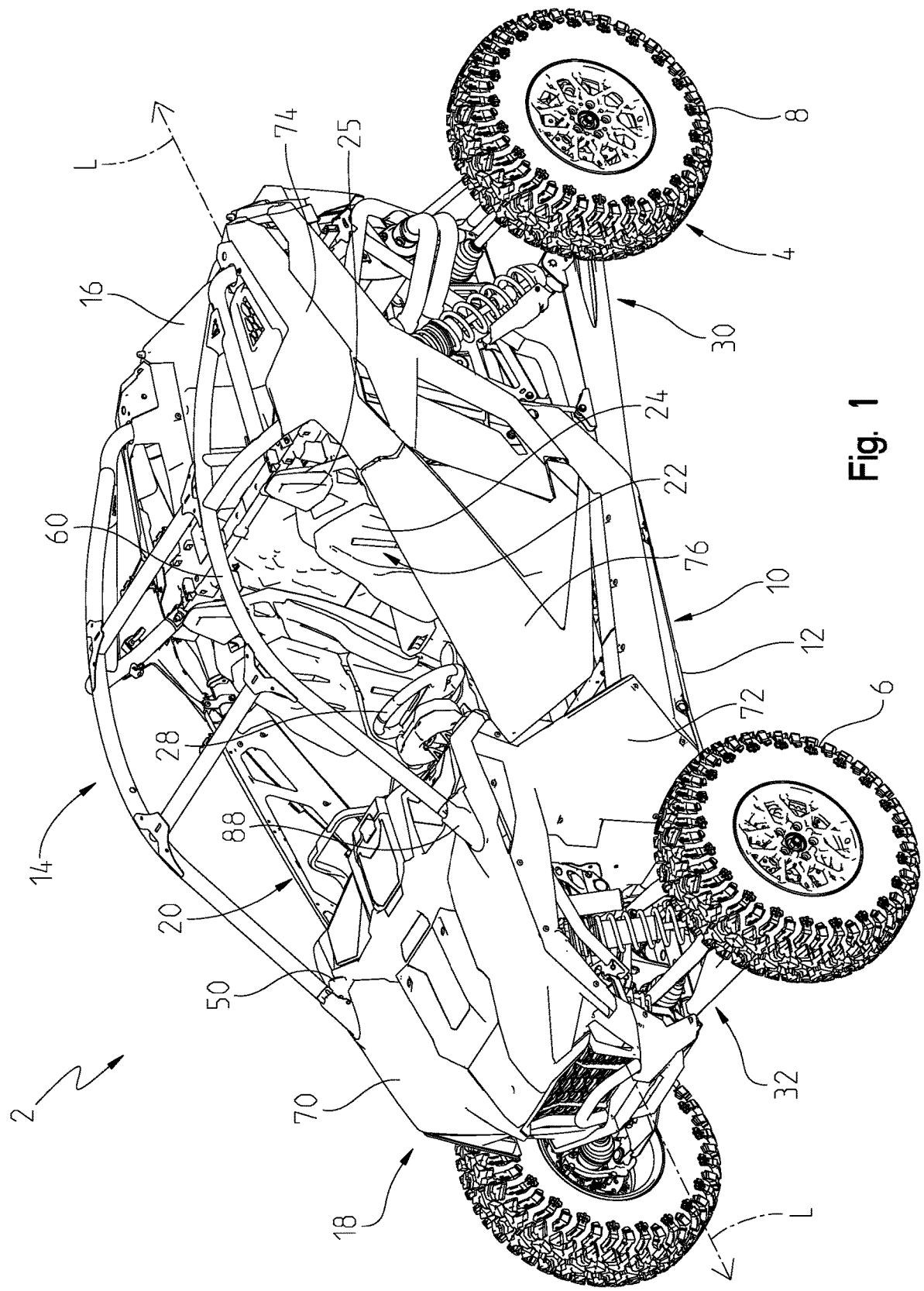
FIG. 1 is a front left perspective view of a utility vehicle of the present disclosure.
Figure 2:
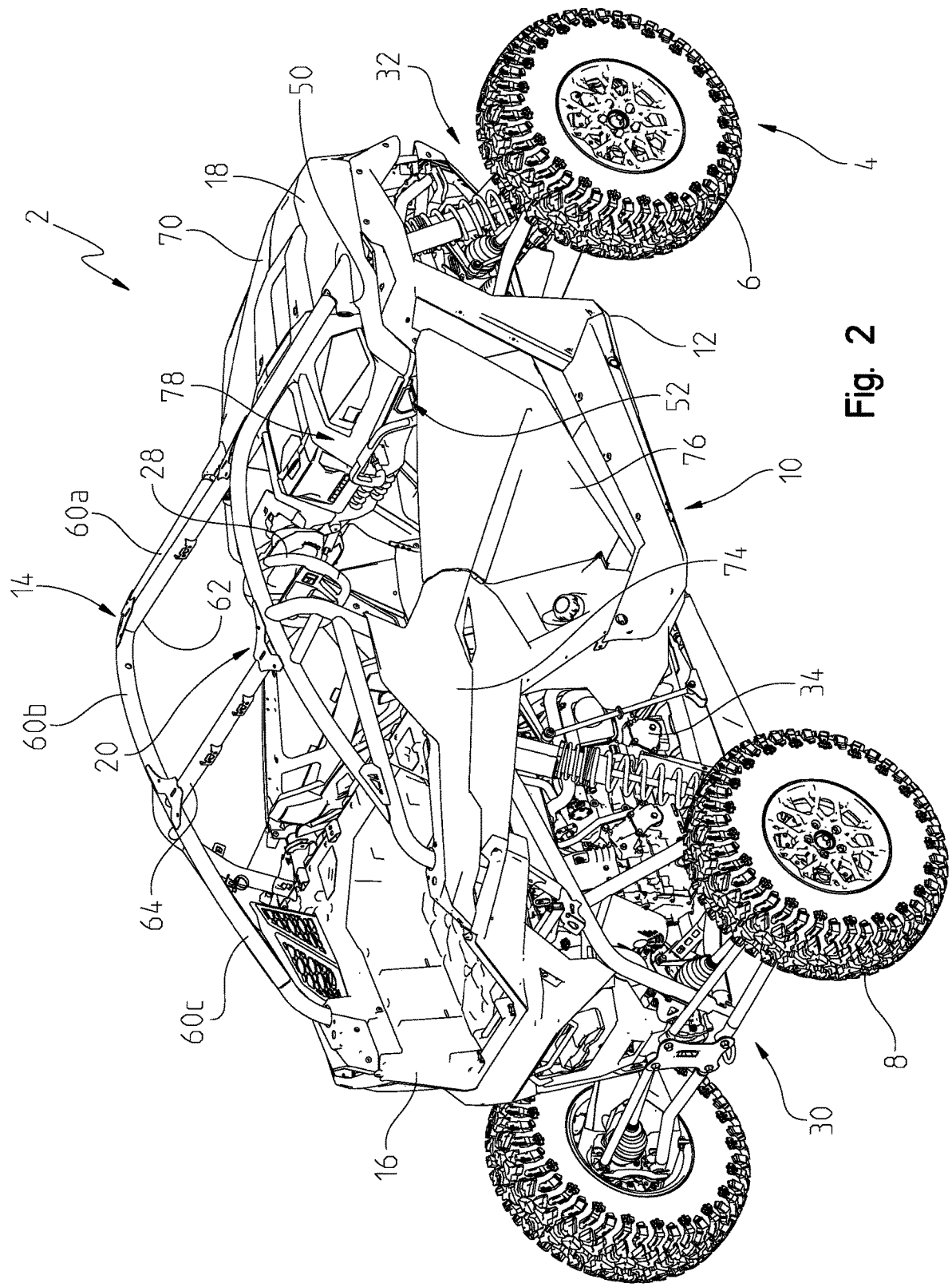
FIG. 2 is a rear right perspective view of the vehicle of FIG. 1.

Vehicle 2 further includes a frame assembly 10 supported by ground-engaging members 4, which extends along a longitudinal axis L of vehicle 2 (FIG. 1). Additionally, in one embodiment, frame assembly 10 may include a lower frame assembly 12 and an upper frame assembly 14 extending vertically above lower frame assembly 12; however, alternative embodiments of vehicle 2 may not include upper frame assembly 14. At least lower frame assembly 12 supports a rear cargo area 16 and a vehicle body 18, which includes a plurality of body panels.

In one embodiment, upper frame assembly 14 includes a plurality of frame members removably or permanently coupled together. As used herein, "coupled," "couples," "coupling," or any variation thereof defines a permanent joining (e.g., welding) or a temporary or removable joining (e.g., bolts, nuts, screws, etc.). As shown in FIGS. 1-7, upper frame assembly 14 includes longitudinally-extending members 60 configured to extend from a front portion of vehicle 2 adjacent an operator area 20 to a rear portion of vehicle 2 adjacent rear cargo area 16. Longitudinally-extending members 60 including a forward portion 60a positioned generally forward of seating 22 in operator area 20, an intermediate portion 60b positioned generally above seating 22, and a rearward portion 60c positioned generally rearward of seating 22. Additionally, upper frame assembly 14 includes at least one cross-member and, illustratively includes a forward cross-member 62 and a rearward cross-member 64, each of which are coupled to longitudinally-extending members 60.

Referring still to FIGS. 1-7, vehicle body 18 includes various body panels supported along longitudinal axis L of vehicle 2. More particularly, vehicle body 18 includes a hood assembly 70, front side panels or fenders 72, rear side panels or fenders 74, doors 76, and a dashboard assembly 78. As shown best in FIGS. 9 and 10, dashboard assembly 78 may include an upper dash portion 80 and a lower dash portion 82. Upper and lower dash portions 80, 82 may be removably or permanently coupled to each other and are configured to support various components of vehicle 2, such as a gauge or display 84, a plurality of inputs 86, a steering wheel 28, and others. Various operator inputs or controls may be further described in U.S. patent application Ser. No. 16/244,462, filed Jan. 10, 2019, and entitled "VEHICLE" and U.S. Provisional Patent Application Ser. No. 62/840,654, filed Apr. 30, 2019, and entitled "VEHICLE", the complete disclosures of which are expressly incorporated by reference herein.

Vehicle 2 also includes an open-air operator area 20 which, illustratively, includes seating 22 for one or more passengers. As such, operator area 20 is exposed to ambient air and may not be fully enclosed. Alternatively, vehicle 2 may include a cab assembly (not shown), such as a roof, front windshield, rear windshield, doors, or any combination thereof to enclose operator area 20. Upper frame assembly 14 may be positioned generally around operator area 20 such that seating 22 is at least partially surrounded by upper frame assembly 14. Illustratively, seating 22 includes an operator seat and a passenger seat, however, seating 22 may also include rear seats for additional passengers or may include only a single seat for carrying the operator. Seating 22 may include a seat back 24 having a head rest 25 (FIG. 1) and a seat bottom 26.

Referring still to FIGS. 1-7, vehicle 2 includes a rear suspension assembly 30 and a front suspension assembly 32, both supported by lower frame assembly 12. Additional details of rear and front suspension assemblies 30, 32 may be disclosed in U.S. patent application Ser. No. 16/226,797, filed Dec. 20, 2018, and entitled "REAR SUSPENSION ASSEMBLY FOR A VEHICLE", the complete disclosure of which is expressly incorporated by reference herein.

Referring to FIG., vehicle 2 further includes a powertrain assembly 34 which is supported by lower frame assembly 12 and includes at least a prime mover, illustratively an engine 36, a geartrain which may be configured as a shiftable transmission (not explicitly shown), and a continuously variable transmission ("CVT") 38. Engine 36 is positioned rearward of operator area 20. While the prime mover is disclosed as engine 36, the prime mover may be any type of device configured to provide power to vehicle 2, such as an electric motor, a fuel-based engine, a hybrid engine, a generator, etc. In one embodiment, CVT 38 also is positioned at least partially rearward of operator area 20. CVT 38 may be positioned laterally outward from or to the side of engine 36 in a direction generally perpendicular to a longitudinal axis L of vehicle 2 (FIG. 1) to extend generally parallel to longitudinal axis L. However, CVT 38 also may extend in a generally perpendicular direction relative to longitudinal axis L or may be configured in any orientation relative to longitudinal axis L, engine 36, and the geartrain. For example, in one embodiment, CVT 38 may be positioned longitudinally forward of engine 36 and configured to extend laterally in a direction generally perpendicular to longitudinal axis L.

Figure 8:
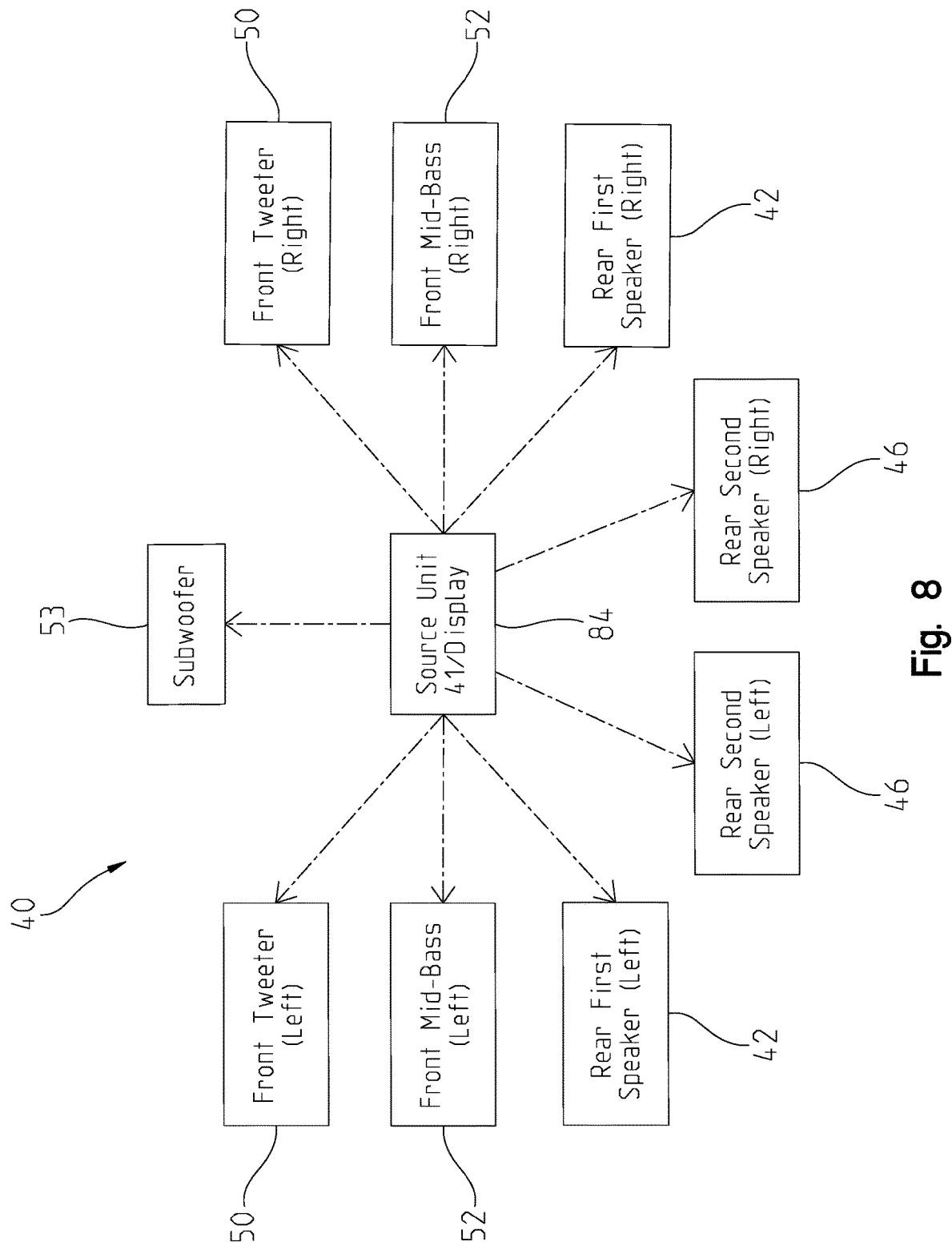
FIG. 8 is a diagrammatic view of an audio system of the vehicle of FIG. 1.

Referring to FIGS. 8-14, vehicle 2 further includes an audio system or assembly 40 configured to project sound into and within operator area 20. In various embodiments, audio system 40 is configured to project music, phone calls or other commands from a cellular phone (e.g., via Bluetooth connectivity), communications between connected vehicles, commands or operating conditions of vehicle 2 (e.g., via connectivity with display 84), etc. into operator area 20 and towards at least the operator. As shown in FIG. 8, audio system 40 includes at least one speaker and, illustratively, includes first rear speakers 42, second rear speakers 46, front speaker sets comprising front tweeters 50 and front mid-bass speakers 52, and a speaker woofer or subwoofer 53. Audio system 40 is configured to receive an input from a source unit 41 (e.g., a music command, a Bluetooth command, a cellular command, a wired command via USB, etc.) to output sound. Source unit 41 is in communication or integrated with display 84 such that the operator or passenger can selectively input a command to initiate the sound output. Once audio system 40 is engaged, at least one signal is transmitted to output sound through any or all of speakers 42, 46, 50, 52 and/or subwoofer(s) 53. It may be appreciated that various embodiments of audio system 40 may not include all of speakers 42, 46, 50, 52 and/or subwoofer 53. Additional details of audio system 40, display 84, source unit 41, and/or operation of Bluetooth commands, intervehicle communications, cellular commands and integration, and others may be disclosed in U.S. patent application Ser. No. 16/234,1692, filed Dec. 27, 2018, and entitled "RECREATIONAL VEHICLE INTERACTIVE TELEMETRY, MAPPING, AND TRIP PLANNING"; U.S. Pat. No. 10,154,377, filed Sep. 12, 2016, and entitled "VEHICLE TO VEHICLE COMMUNICATIONS DEVICE AND METHODS FROM RECREATIONAL VEHICLES"; U.S. patent application Ser. No. 15/161,720, filed May 23, 2016, and entitled "DISPLAY SYSTEMS AND METHODS FOR A RECREATIONAL VEHICLE"; U.S. patent application Ser. No. 16/043,514, filed Jul. 24, 2018, and entitled "RECREATIONAL VEHICLE GROUP MANAGEMENT SYSTEMS"; and U.S. Provisional Patent Application Ser. No. 62/783,601, filed Dec. 21, 2018, and entitled "SYSTEMS AND METHODS FOR CONNECTING ACCESSORIES TO RECREATIONAL VEHICLES", the complete disclosures of which are expressly incorporated by reference herein.

Figure 9:
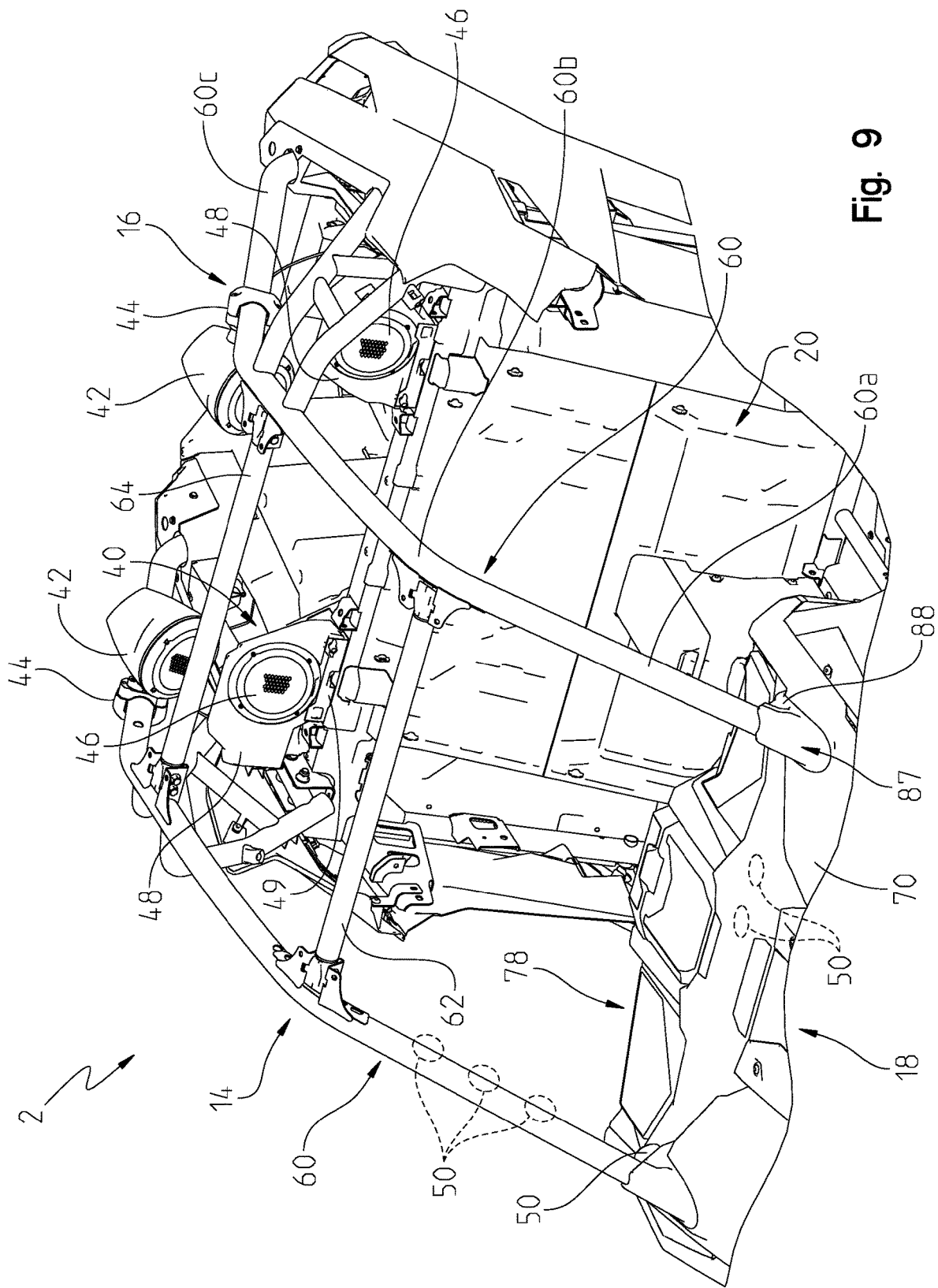
FIG. 9 is a front left perspective view of an operator area of the vehicle of FIG. 1 including the audio system of FIG. 8 having at least one speaker positioned generally rearward of an operator.

Referring to FIG. 9, first and second rear speakers 42, 46 are generally positioned rearwardly of operator area 20 and rearwardly of the operator's and/or passenger's head. In one embodiment, at least second rear speakers 46 are defined as coaxial speakers. First rear speakers 42 are supported by a portion of upper frame assembly 14 and, specifically, may be supported on longitudinally-extending members 60. Illustratively, first rear speakers 42 are removably coupled to rearward portion 60c of longitudinally-extending members 60 with clamps or couplers 44. Clamps 44 may hingedly enclose a portion of rearward portion 60c of longitudinally-extending members 60 to allow easy attachment and removal of first rear speakers 42 to vehicle 2. When attached to longitudinally-extending members 60, first rear speakers 42 may be positioned above a forward portion of rear cargo area 16 and adjacent second rear speakers 46 and head rests 25.

Referring still to FIG. 9, second rear speakers 46 are illustratively positioned below a portion first rear speakers 42 and are supported by lower frame assembly 12, upper frame assembly 14, and/or rear cargo area 16. In one embodiment, second rear speakers 46 are integrated into a body panel or other portion of rear cargo area 16. In one embodiment, second rear speakers 46 include a mounting plate 48 which removably couple to a bracket or mount 49 on frame assembly 10.

As shown in FIG. 9, first and second rear speakers 42, 46 may be positioned on both the right and left sides of vehicle 2 and are directed towards operator area 20. It may be apparent that first and second rear speakers 42, 46 are positioned generally adjacent and/or above head rest 25 (FIG. 1) of seating 22 and above at least a portion of doors 76. In this way, speakers 42, 46 face the operator and are configured to direct sound towards the head of the operator and/or the passenger to improve the sound quality heard by the operator and/or passenger. Additionally, the projection of the sound from speakers 42, 46 is not impeded or redirected by any panels or other components of vehicle 2, thereby, again, allowing enhanced sound quality to be heard within operator area 20. Because vehicle 2 may be an open-air vehicle with an open-air operator area 20, first and second rear speakers 42, 46 are positioned to direct sound at the operator's head without any hinderance to the sound.

Referring now to FIGS. 10-14, audio system 40 further includes front speaker sets, comprised of front tweeters 50 and front mid-bass speakers 52, and subwoofer 53. Subwoofer 53 may be positioned on lower dash portion 82 and, more particularly, may be positioned adjacent a storage compartment (e.g., a glove compartment) 83. Illustratively, subwoofer 53 are positioned below glove compartment 83. Subwoofer 53 faces rearwardly to direct sound towards the operator.

Figure 5:
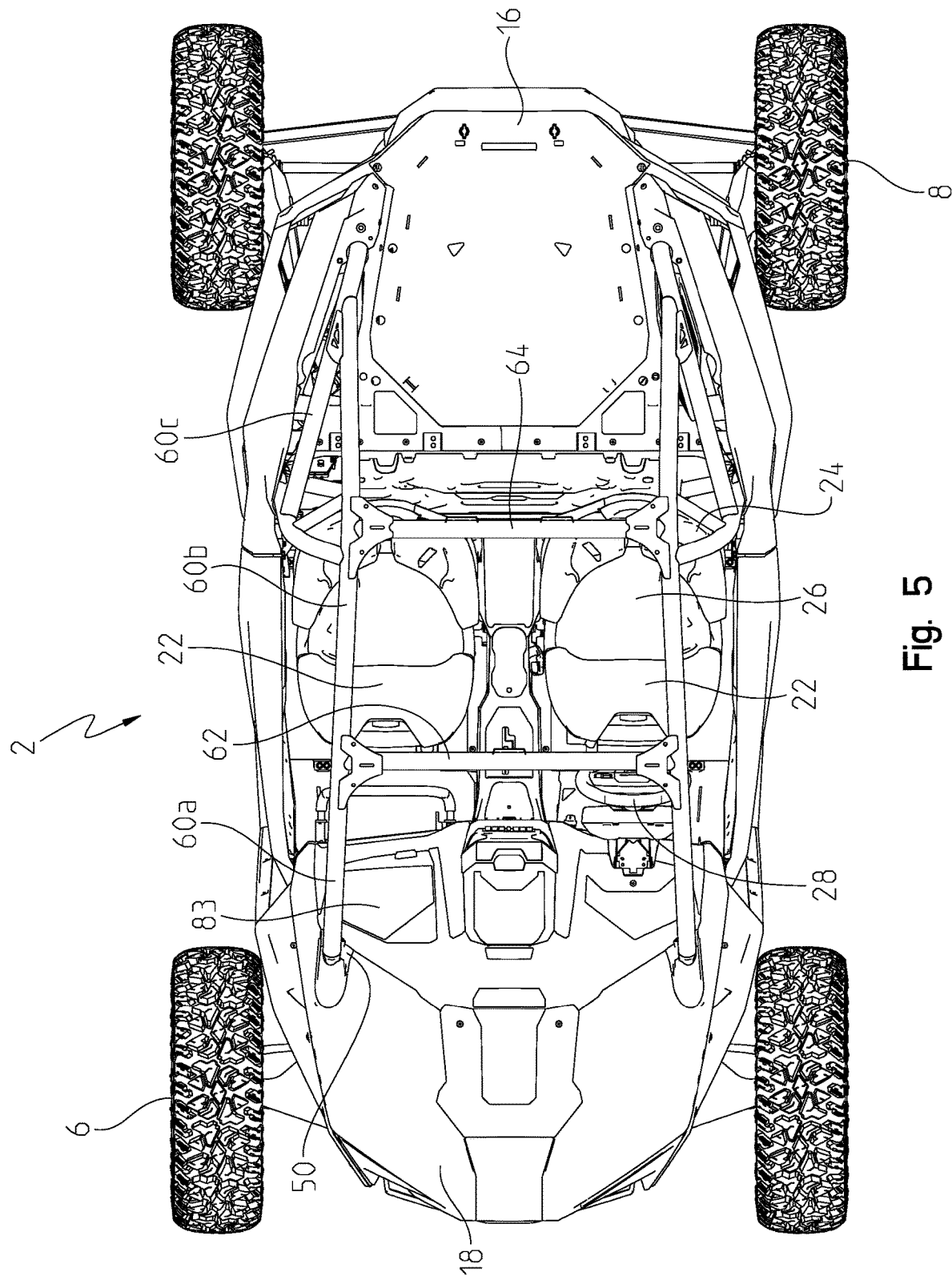
FIG. 5 is a top view of the vehicle of FIG. 1.
Figure 6:
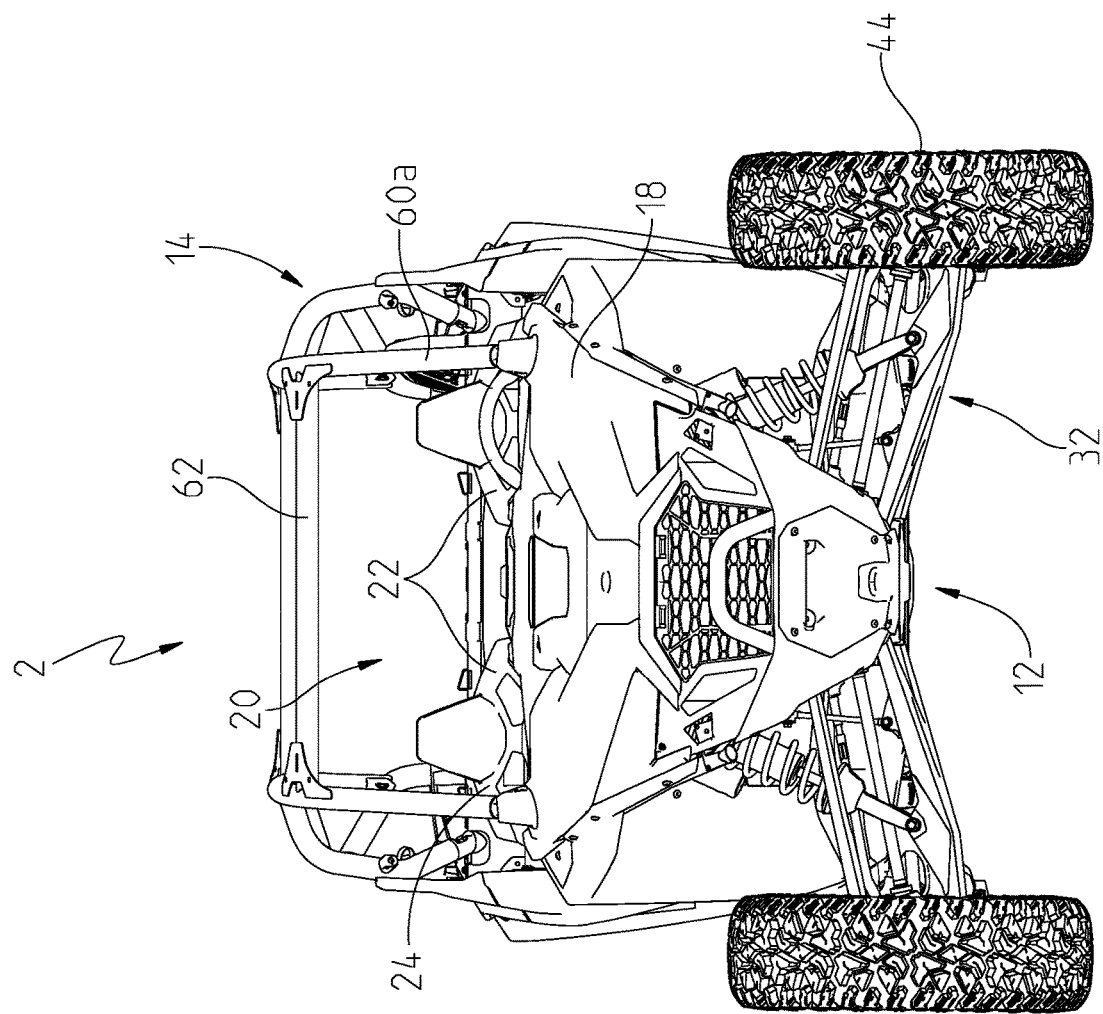
FIG. 6 is a front view of the vehicle of FIG. 1.
Figure 7:
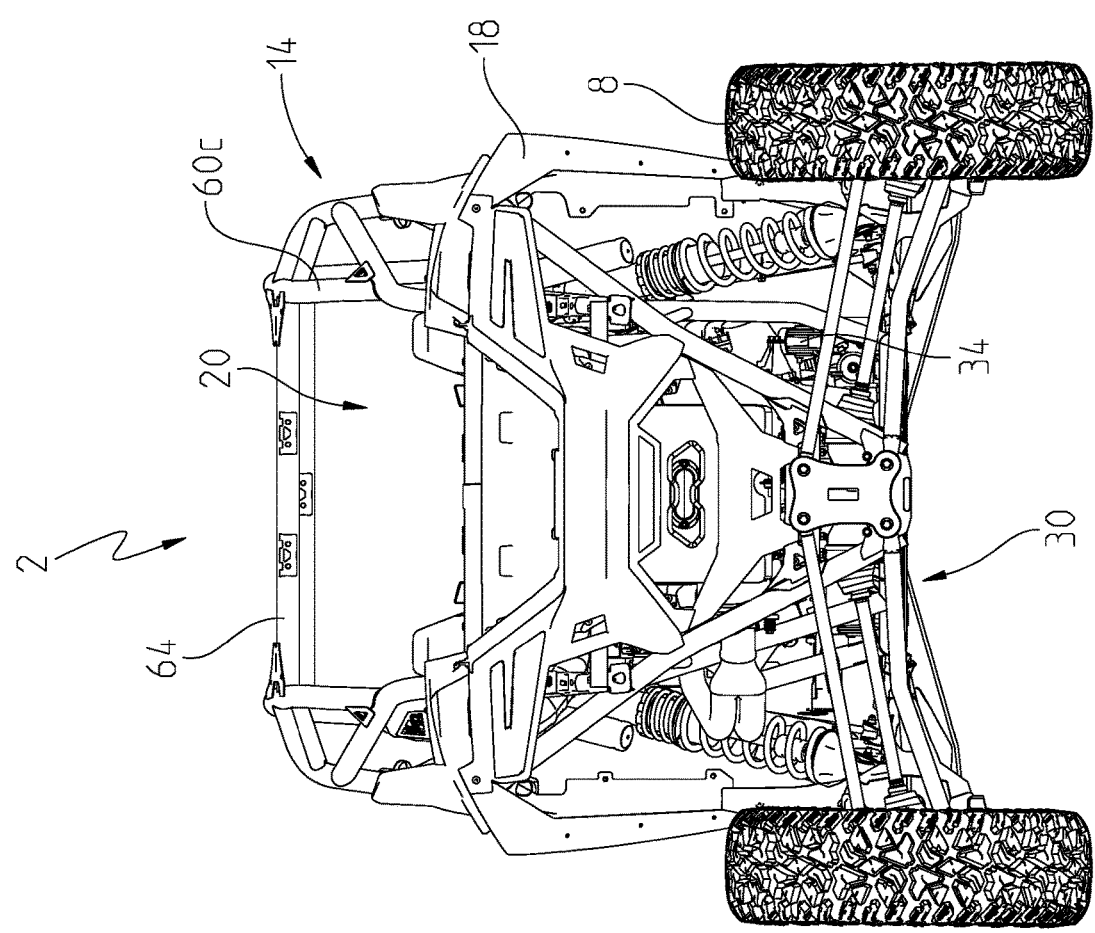
FIG. 7 is a rear view of the vehicle of FIG. 1.

Front speakers 50, 52 are positioned generally forward of seating 22 (FIG. 1) and are supported on or adjacent to dashboard assembly 78. More particularly, speakers 52 are positioned within lower dash portion 82 and face in a rearward direction towards seating 22. Speakers 52 are spaced apart from doors 76 such that any sound emanating from speakers 52 is not impeded or redirected by panels on doors 76. In one embodiment, speaker 52 along the left side of vehicle 2 is positioned generally adjacent a portion of steering wheel 28 (FIG. 1) and speaker 52 along the right side of vehicle 2 is positioned generally adjacent glove compartment 83 of dashboard assembly 78. In this way, speakers 52 are positioned away from door 76 and above the floor of vehicle 2 to better direct sound towards the operator and passenger. Further, at least a portion of speakers 52 is positioned at a vertical height greater than that of seat bottom 26 (FIG. 5).

Front tweeters 50 also area positioned away from door 76 and above the floor of vehicle 2. Additionally, front tweeters 50 are positioned at a vertical height greater than that of at least seat bottom 26 (FIG. 5). In this way, like speakers 52, front tweeters 50 also direct sound rearwardly into operator area 20 such that sound is not redirected off of a body panel or other component of vehicle 2. Therefore, front tweeters 50 and speakers 52 enhance the sound quality experienced by the operator and/or the front passenger.

With reference still to FIGS. 10-14, front tweeters 50 are positioned above a portion of dashboard assembly 78 and, specifically, above an upper extent of upper dash portion 80. Additionally, front tweeters 50 are positioned adjacent forward portion 60a of longitudinally-extending members 60 of upper frame assembly 14. Illustratively, tweeters 50 are positioned rearward of a coupling location 87 between forward portion 60a and lower frame assembly 12 and also are positioned above at least a portion of steering wheel 28. Further, tweeters 50 also are positioned above a majority of seating 22 and, more specifically, are positioned above seat bottom 26 and are generally aligned with head rest 25 of seat back 24.

Figure 10:
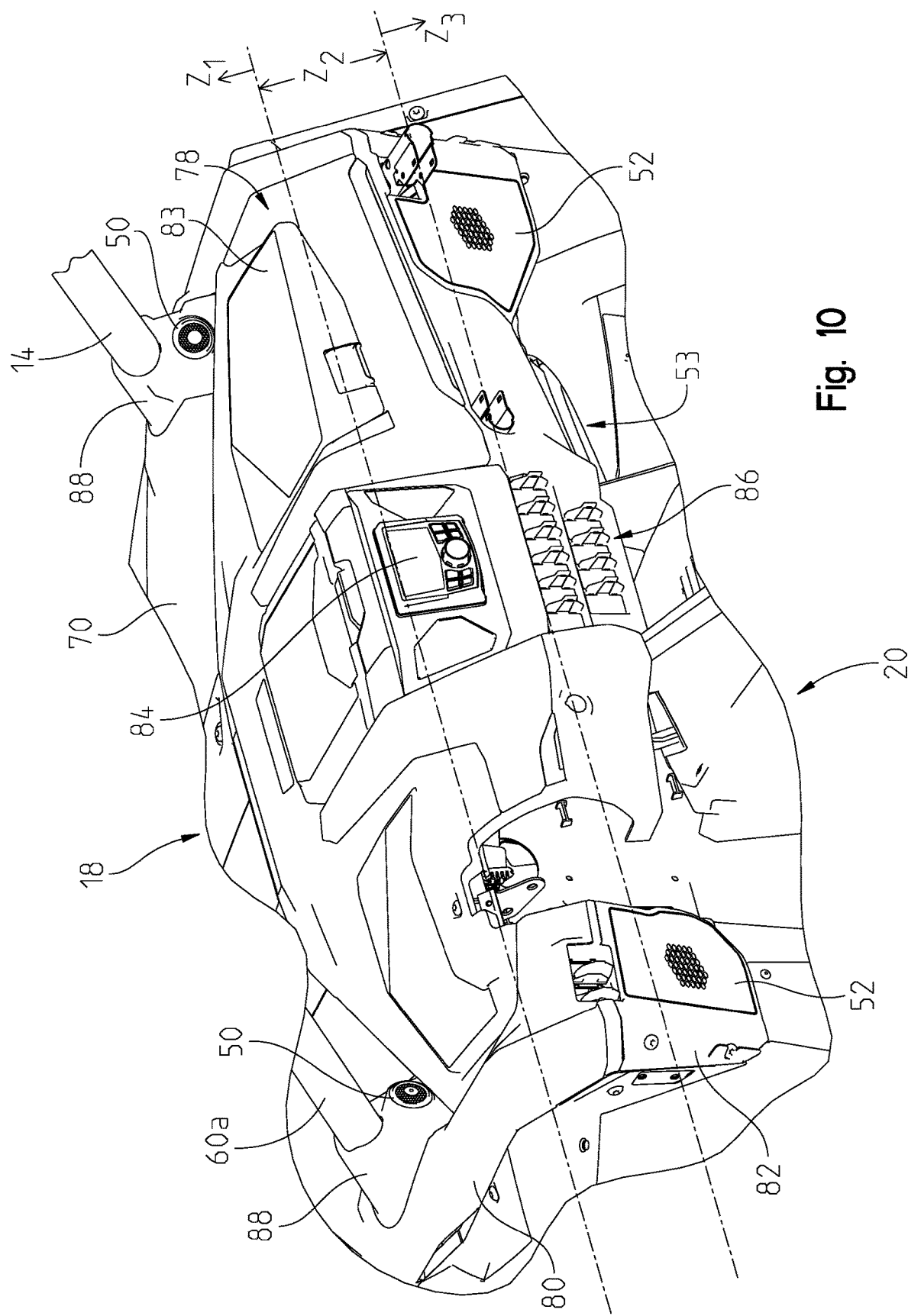
FIG. 10 is a rear left perspective view of the operator area of FIG. 9 which is configured to support additional components of the audio system of FIG. 8
Figure 11:
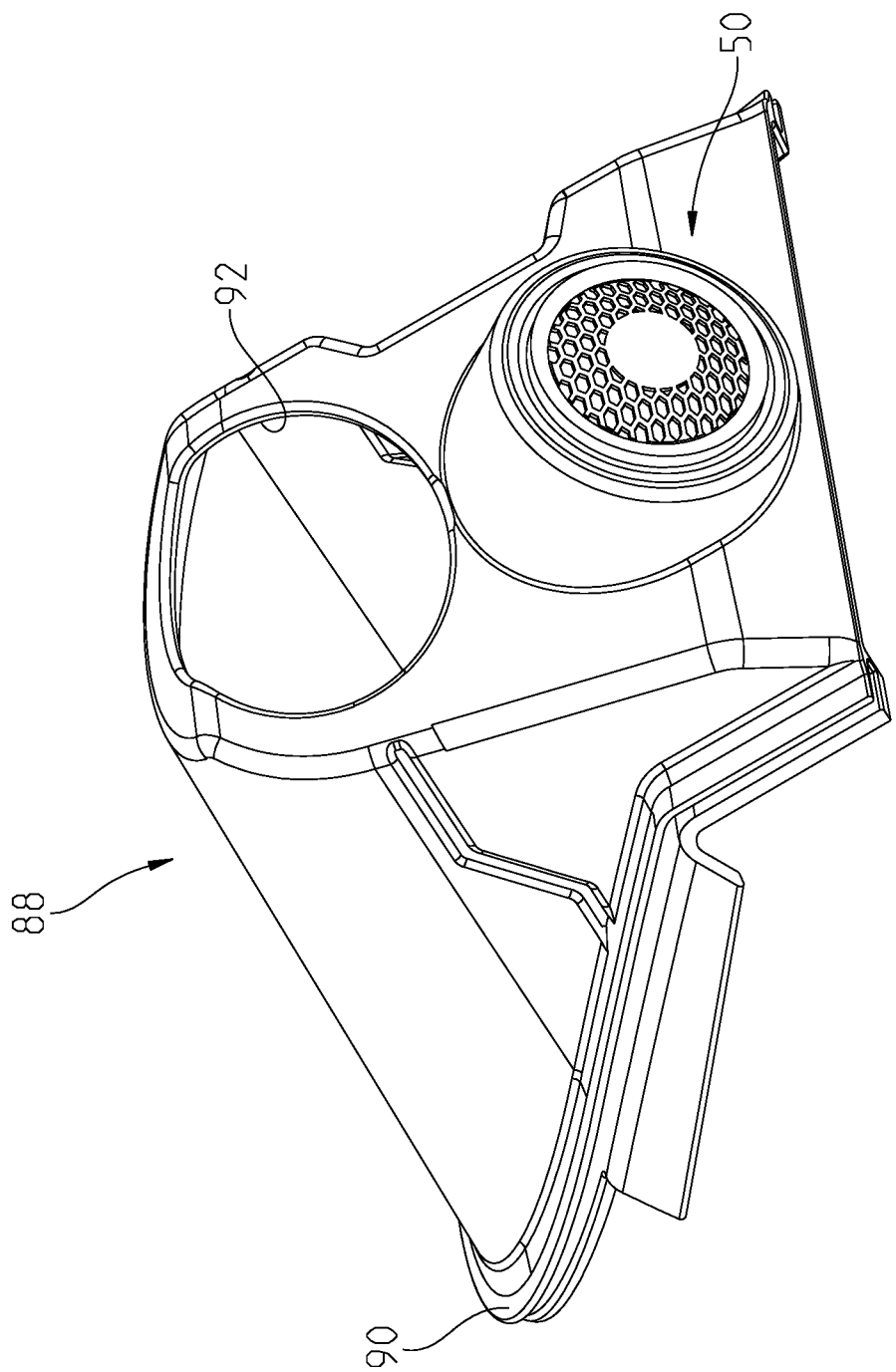
FIG. 11 is a rear left perspective view of a body panel or enclosure configured to support a speaker of the audio system of FIG. 10.
Figure 12:
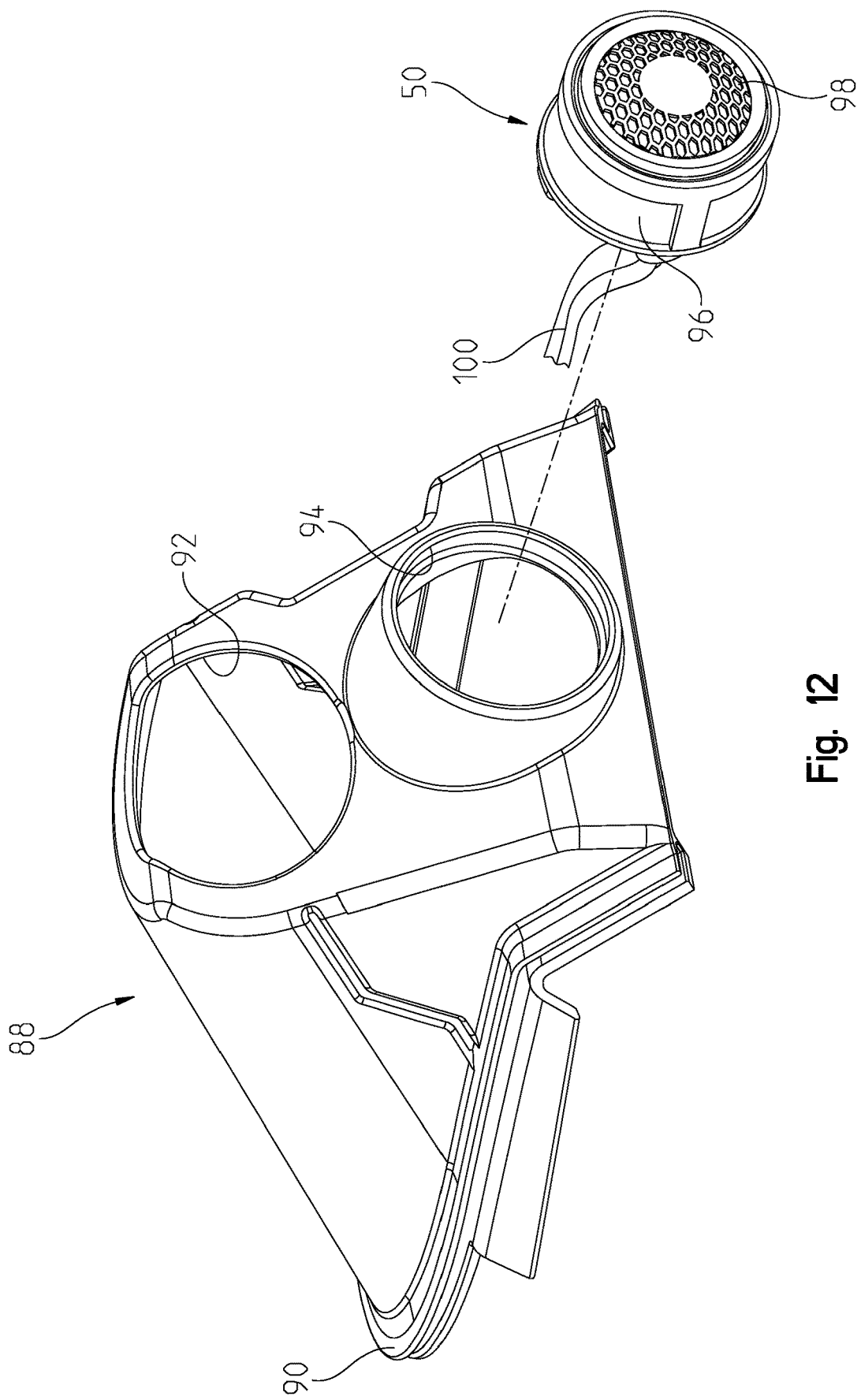
FIG. 12 is an exploded view of the enclosure and the speaker of FIG. 11.
Figure 13:
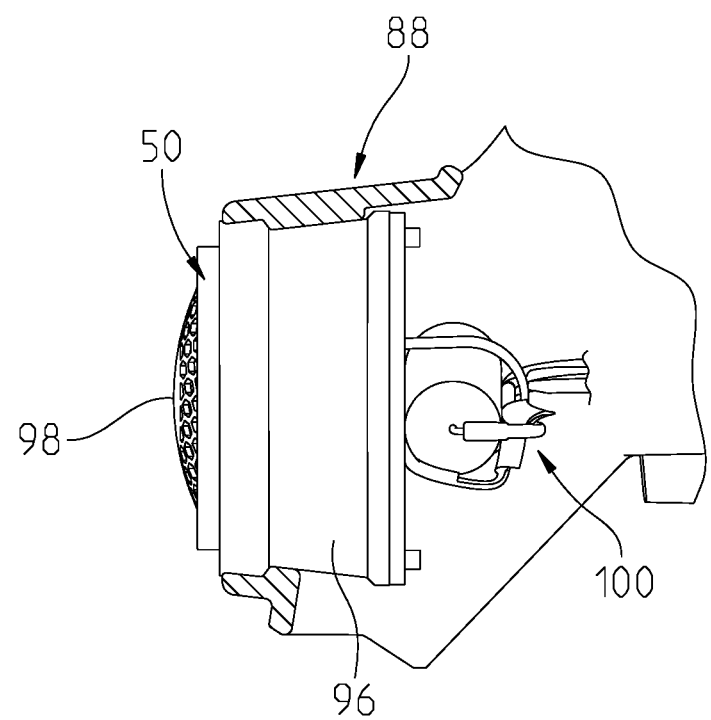
FIG. 13 is a cross-sectional view of the enclosure and the speaker of FIG. 11.
Figure 14:
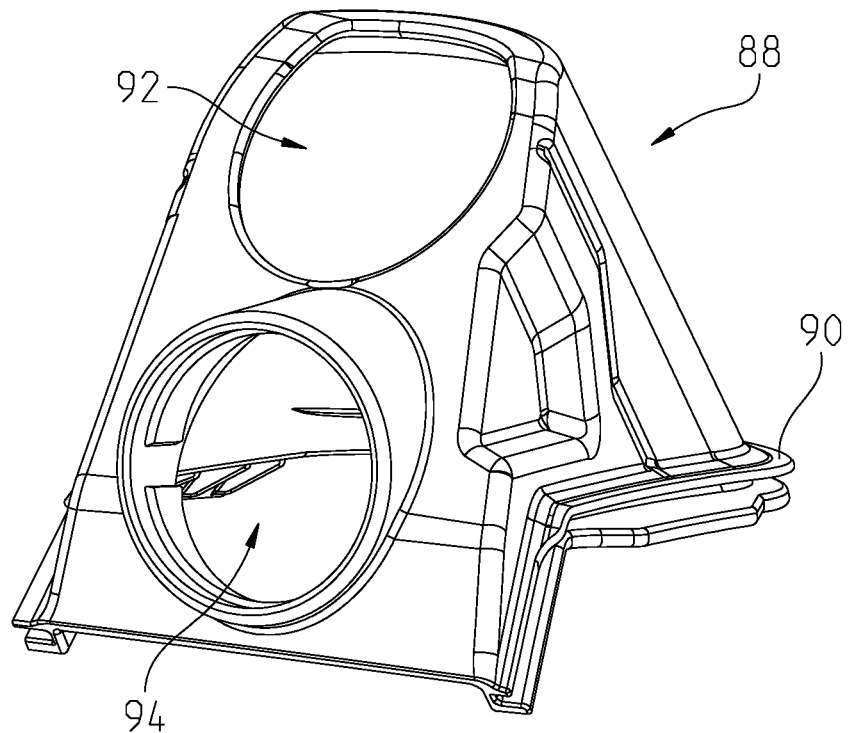
FIG. 14 is a rear right perspective view of the enclosure with the speaker removed.

Alternatively, as shown in FIG. 9, tweeters 50 also may be positioned along the length longitudinally-extending members 60 or may be positioned along or within the upper surface of dashboard assembly 78. If tweeters 50 are positioned along the length of longitudinally-extending members 60 and/or at the upper surface of dashboard assembly 78, tweeters 50 still face rearwardly (as shown in FIG. 10) towards operator area 20 to direct sound towards the operator's head/ears. It may be apparent that that various positions of tweeters 50 shown in FIG. 9 are positioned at or above the upper surface of dashboard assembly of an off-road vehicle and direct sound towards an operator's head for enhanced sound quality within the open-air operator area 20.

An enclosure 88 of vehicle body 18 is coupled to upper dash portion 80 and sealed thereto with a seal 90. Enclosure 88 is configured to conceal the connection of upper frame assembly 14 to lower frame assembly 12 at the lower end of forward portion 60a (shown as connection or coupling location 87 in FIG. 9). More particularly, upper frame assembly 14 is configured to couple (e.g., via welds or bolts) with lower frame assembly 12 at the lower ends of at least forward portion 60a and rearward portion 60c of longitudinally-extending members 60. This connection location or joint of forward portion 60a and lower frame assembly 12 is shown at 87 in at least FIG. 9. As such, a visible joint may be created at the lower ends of portions 60a, 60c which affect the aesthetics of vehicle 2.

Coupling location 87 between upper frame assembly 14 and lower frame assembly 12 at forward portion 60a also provides available space on vehicle 2 for additional speakers of audio system 40, such as tweeters 50. This location also allows tweeters 50 to face rearwardly and direct sound into operator area 20 without the sound being redirected by other panels or surfaces of vehicle 2. In this way, tweeters 50 positioned adjacent the lower end of forward portion 60a are spaced apart from lower, more enclosed areas of operator area 20 (such as a kick panel or a lower portion of door 76) which could negatively impact the direction and quality of the sound output by tweeters 50.

Referring still to FIGS. 9-14, enclosure 88 may be comprised as a rubber boot or enclosure. In some embodiments, enclosure 88 may be comprised of the same material and color as hood assembly 70 or front side panels 72 such that enclosure 88 aesthetically matches other portions of vehicle body 18. Alternatively, if the design of vehicle 2 dictates that enclosure 88 should be a different color and/or material than other portions of vehicle body 18 (e.g., the same material and/or color as longitudinally-extending member 60), such options are available because enclosure 88 is separable from hood assembly 70, front side panel 72, and dashboard assembly 78.

It may be appreciated that enclosure 88 is a single component of vehicle body 18 that is configured to support a portion of upper frame assembly 14 (e.g., forward portion 60a of longitudinally-extending members 60), support a portion of audio system 40 (e.g., front tweeter 50), seal with hood assembly 70, front side panel 72, and/or dashboard assembly 78 to prevent fluids or dirt and debris from entering vehicle 2 at that location, and conceal the joint or connection between forward portion 60a of longitudinally-extending member 60 and lower frame assembly 12 (i.e., coupling location 87). As shown best in FIGS. 11-14, enclosure 88 includes a first opening 92 configured to receive a portion of forward portion 60a. First opening 92 is positioned above a lower surface of enclosure 88 which allows the body of enclosure 88 to conceal the connection or joining of forward portion 60a to lower frame assembly such that forward portion 60a extends through opening 92 when joined with lower frame assembly 12.

Enclosure 88 also includes a second opening 94 (FIG. 14) configured to receive front tweeter 50. In one embodiment, second opening 94 is positioned below first opening 92 such that forward portion 60a extends over and above tweeter 50. This vertical alignment of openings 92, 94 also allows for a compact configuration of enclosure 88. When tweeter 50 is received within opening 94 and supported on enclosure 88, a speaker body 96 is concealed within enclosure 88 such that only a speaker mesh 98 is visible within operator area 20. Additionally, electrical components 100 of tweeter 50 (e.g., wiring) extend through opening 94 and also are concealed by enclosure 88. In this way, enclosure 88 allows for tweeters 50 to be positioned for enhanced sound quality within operator area 20 and also conceals the joining of forward portion 60a and lower frame assembly 12 in the same general location of tweeter 50.

Figure 3:
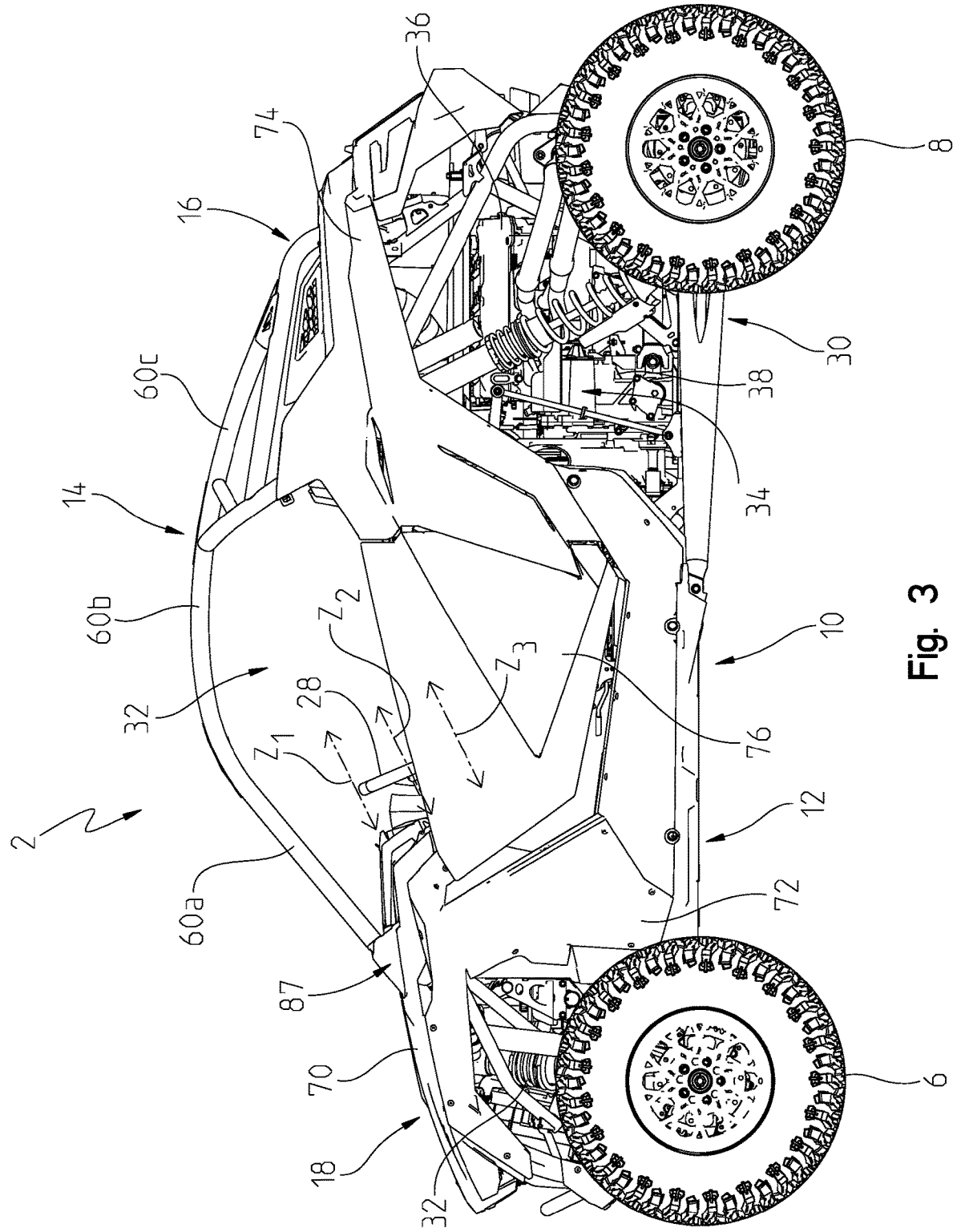
FIG. 3 is a left side view of the vehicle of FIG. 1.
Figure 4:
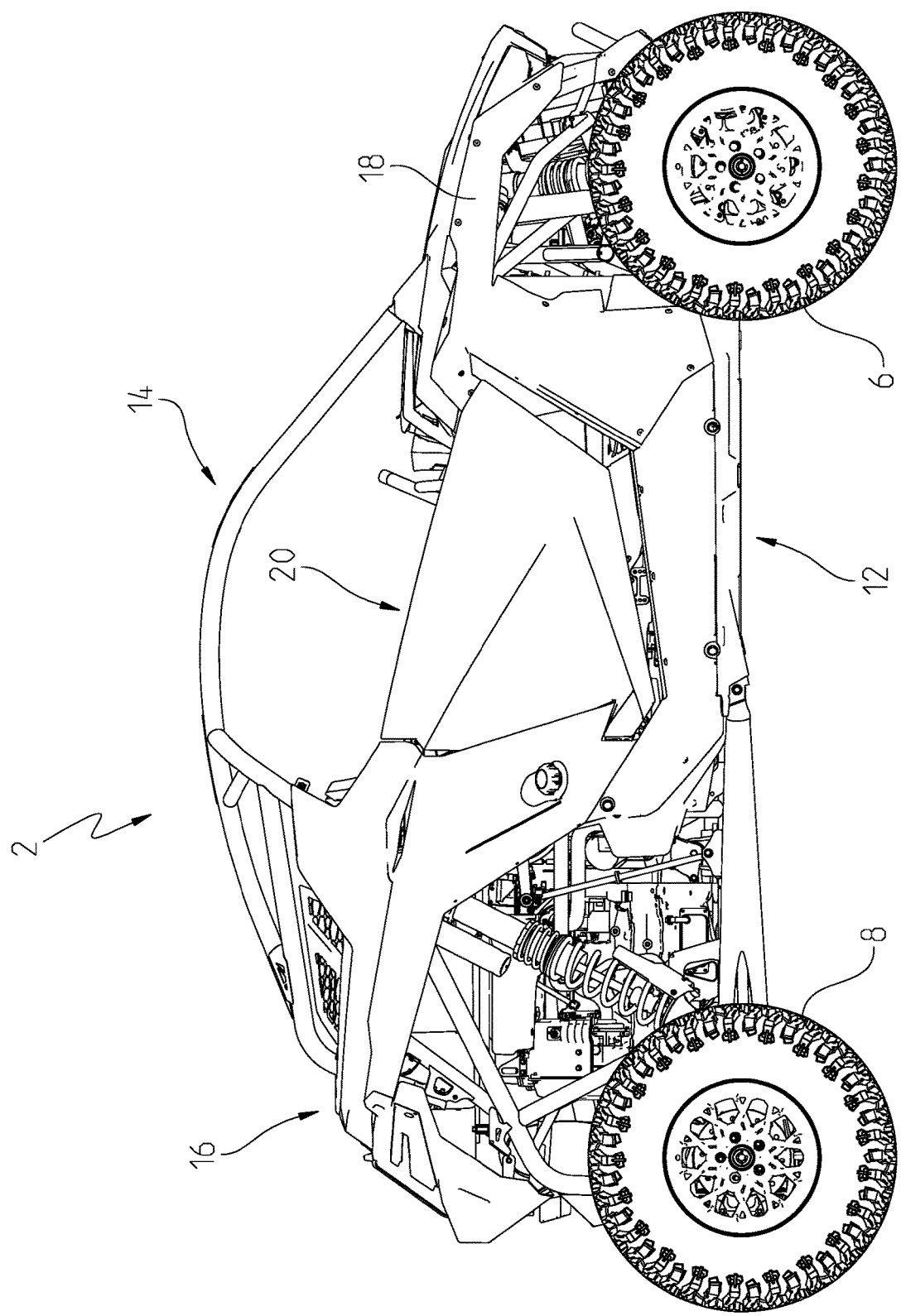
FIG. 4 is a right side view of the vehicle of FIG. 1.

Referring to FIGS. 3 and 10, because vehicle 2 may be an open-air vehicle, audio system 40 is configured to directly project sound towards the operator. In order to accomplish this, various speakers and components of audio system 40 are positioned to best direct sound towards the operator's head/ears. More particularly, if operator area 20 is divided into three sound zones (where zone 1 is labeled $Z_1$, zone 2 is labeled as $Z_2$ and positioned below zone 1, and zone 3 is labeled as $Z_3$ and positioned below zone 2) as shown in FIGS. 3 and 10, it is apparent that head rest 25 and, therefore, the operator's and passenger's heads are positioned in zone 1. Zone 2 may include the operator's shoulders and is positioned below head rest 25. Zone 3 may include the operator's mid-section or legs and is positioned along the mid-portion of seat back 24. Audio system 40 of the present disclosure is configured to direct sound within zone 1 such that sound is directed at the operator's head/ears. However, additional speakers or components of audio system 40 may also direct sound within zone 2. It may be apparent that zone 3 is away from the operator's head and, therefore, audio system 40 is not configured to direct sound therein. For example, rear speakers 42, 46 and front tweeters 50 may be configured and positioned to direct sound within zone 1 where the operator's head is positioned, thereby allowing multiple speakers to project sound directly towards the operator. Additionally, mid-bass speakers 52 may be configured to project sound within zone 2 for enhanced sound within operator area 20 because speakers 52 also are directly projecting sound towards the operator, rather than being positioned at a location where sound might be obstructed or redirected by other surfaces. As shown and disclosed herein, zones 1 and 2 are positioned above the floor and above at least half of the door in the vertical direction, and as such, audio system 40 is configured for sound to be directed towards the operator's head within at least zone 1.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An audio system of an open air vehicle, comprising:
    a first speaker positioned to direct sound towards an operator compartment; and
    a panel of the vehicle with an audio enclosure comprising:
        an outer surface positioned exterior of an outward facing portion of an upper frame assembly of the vehicle; and
        an inner surface configured to support the first speaker within the audio enclosure, a portion of the inner surface positioned adjacent a portion of the upper frame assembly of the vehicle;
    wherein a portion of the panel is configured to surround a perimeter of a portion of a frame member of the upper frame assembly; and
    the first speaker is positioned to be pointed towards an operator.

2. The audio system of claim 1, wherein a portion of the first speaker is positioned inward from the upper frame assembly.

3. The audio system of claim 2, wherein the inner surface is in contact with the outward facing portion of the upper frame assembly.

4. The audio system of claim 1, wherein the outer surface and the inner surface collectively comprise a first portion and a second portion, the first portion being configured to couple to the upper frame assembly and the second portion including an opening configured to receive the first speaker, wherein the first portion and the second portion are integrally formed.

5. The audio system of claim 1, further comprising a second speaker, wherein the first speaker directs sound into a first zone, and the second speaker is configured to project sound into a second zone; and
the first zone is different than the second zone.

6. An audio system for an open-air vehicle, the vehicle comprising an upper frame assembly configured to surround an open-air operator area, the upper frame assembly comprising a pair of longitudinally extending frame members, a first cross-member extending laterally between the pair of longitudinally extending frame members and a second cross-member extending laterally between the pair of longitudinally extending frame members, the audio system comprising:
 a first speaker positioned to direct sound towards a first zone of the open-air operator area, the first speaker operably coupled to the upper frame assembly;
 a second speaker positioned to direct sound towards a second zone of the open-air operator area; and
 a panel configured to surround a perimeter of a portion of a frame member of the upper frame assembly and operable to support at least one of the first and second speakers, wherein the panel includes an outer surface positioned exterior of an outward facing portion of the upper frame assembly and an inner surface configured to support the first speaker, wherein a portion of the inner surface is positioned adjacent a portion of the upper frame assembly of the vehicle;
 wherein a portion of the panel is configured to surround a perimeter of a portion of a frame member of the upper frame assembly;
 wherein the first speaker is configured to be positioned forwardly of one of the first cross-member and the second cross-member and the second speaker is configured to be positioned rearwardly of the other of the first-cross member and the second cross-member; and
 wherein the first zone and the second zone offset from each other.

7. The audio system of claim 6, further comprising a third speaker positioned rearward of the open-air operator area.

8. The audio system of claim 7, wherein the third speaker is configured to project sound towards an area rearward of the open-air operator area.

9. The audio system of claim 6, wherein the first speaker is positioned forward of the open-air operator area.

10. The audio system of claim 6, wherein the second zone is vertically below the first zone.

11. A panel of an open-air vehicle with an upper frame assembly covering an operator area, the upper frame assembly comprising an outer facing surface and an inner facing surface, the outer facing surface facing away from the operator area and the inner facing surface facing towards the operator area, the panel including an audio enclosure, the panel comprising:
 a first opening configured to receive a speaker, the speaker positioned to direct audio toward the operator area; and
 a receiving portion configured to receive a perimeter of a portion of a frame member of the upper frame assembly, the receiving portion further configured to conceal a coupling point of the upper frame assembly from a position outside the operator area; and
 wherein the audio enclosure is positioned above a door of the vehicle.

12. The panel of claim 11, wherein the receiving portion has a generally rounded shape.

13. The panel of claim 11, wherein a portion of the speaker is positioned closer to the operator area than the inner facing surface of the upper frame assembly.

14. The panel of claim 11, wherein the receiving portion receives a generally longitudinally extending member of the upper frame assembly.

15. The panel of claim 11, wherein a first portion of the panel extends outward from the outer facing surface of the upper frame assembly, and a second portion of the panel extends inward from the inner facing surface of the upper frame assembly.

16. The panel of claim 11, wherein the audio enclosure is positioned above a dash assembly.

* * * * *